United States Patent [19]

Onishi et al.

[11] Patent Number: 5,202,025
[45] Date of Patent: Apr. 13, 1993

[54] POROUS MEMBRANE AND METHOD FOR PREPARING THE SAME

[75] Inventors: Makoto Onishi; Kenichi Shimura, both of Kanagawa, Japan

[73] Assignee: Terumo Kabushiki Kaisha, Tokyo, Japan

[21] Appl. No.: 821,844

[22] Filed: Jan. 14, 1992

Related U.S. Application Data

[63] Continuation of Ser. No. 507,511, Apr. 11, 1990, abandoned.

[30] Foreign Application Priority Data

Apr. 12, 1989 [JP] Japan ................... 1-92354

[51] Int. Cl.$^5$ ................... B01D 53/22; B01D 71/78
[52] U.S. Cl. ................... 210/500.35; 210/500.42; 210/506
[58] Field of Search ............... 210/645, 650, 651, 490, 210/500.23, 500.35, 500.42, 506

[56] References Cited

U.S. PATENT DOCUMENTS

| | | | |
|---|---|---|---|
| 3,657,113 | 4/1972 | Stancell et al. | 210/506 X |
| 4,262,041 | 4/1981 | Eguchi et al. | 210/506 X |
| 4,613,440 | 9/1986 | Zupancic et al. | 210/506 X |
| 4,617,124 | 10/1986 | Pall et al. | 210/508 X |
| 4,618,533 | 10/1986 | Steuck | 210/500.35 X |
| 4,645,592 | 9/1987 | Itoh et al. | 210/500.38 X |
| 4,695,592 | 9/1987 | Itoh et al. | 210/500.38 X |
| 4,713,292 | 12/1987 | Takemura et al. | 210/500.42 X |
| 4,717,479 | 1/1988 | Itoh et al. | 210/506 X |
| 4,824,568 | 4/1989 | Allegrezza, Jr. et al. | 210/500.42 X |
| 4,845,132 | 7/1989 | Masuoka et al. | 210/500.38 X |
| 4,943,373 | 7/1990 | Onishi et al. | 210/500.42 |

FOREIGN PATENT DOCUMENTS

| | | |
|---|---|---|
| 0183103 | 6/1986 | European Pat. Off. . |
| 0203454 | 12/1986 | European Pat. Off. . |
| 0392010 | 10/1990 | European Pat. Off. . |
| 54-24987 | 8/1979 | Japan . |
| 54-024987 | 8/1979 | Japan . |
| 56-003062 | 1/1981 | Japan ................... 210/506 |
| 59-160504 | 9/1984 | Japan . |
| 61-146308 | 7/1986 | Japan . |
| 62-079806 | 4/1987 | Japan ................... 210/500.42 |
| 62-148667 | 7/1987 | Japan . |
| 62-163703 | 7/1987 | Japan . |
| 62-262705 | 11/1987 | Japan . |
| WO88/09200 | 12/1988 | PCT Int'l Appl. . |

OTHER PUBLICATIONS

Polymer Handbook, 3rd Edition, edited by J. Brandrup & E. H. Immergut, "Propagation and Termination Constants in Free Radical Polymerization", pp. II/67–II/69 & II/81, II/82 & II/94.

M. Onishi et al., Radiat. Phys. Chem. vol. 39, No. 6, 1992, pp. 569–576, "Preparation and Properties of Plasma-initiated Graft copolymerized membranes for Blood Plasma Separation".

*Primary Examiner*—Robert Spitzer
*Attorney, Agent, or Firm*—Burns, Doane, Swecker & Mathis

[57] ABSTRACT

In the method for preparing a porous membrane, a polymer having a low glass transition temperature is held on the surface of a porous membrane substrate and then drawing is conducted. Accordingly, the drawing at a high draw ratio can be conducted to which the substrate as such can not be subjected. As a result, not only an excellent porous membrane having an enlarged pore size and an increased void volume can be obtained, but also it is possible to control the pore size and the void volume in wide ranges. Further, a hydrophilic polymer having a glass transition temperature of not more than 300 K is formed on the surface of pores of a porous membrane substrate by graft polymerization so as to bond the hydrophilic polymer on the substrate by a covalent bond. Therefore, it is possible to provide a porous membrane excellent in unbrittleness and inhibiting elution in an environmental liquid or the like.

32 Claims, 2 Drawing Sheets

POROUS MEMBRANE AND METHOD FOR PREPARING THE SAME

This application is a continuation of application Ser. No. 07/507,511, filed Apr. 11, 1990, now abandoned.

BACKGROUND OF THE INVENTION

1. Field of the Invention

The present invention relates to a porous membrane and a method for preparing the same, and a filter and a liquid treating module using the same. More particularly, the present invention is concerned with a porous membrane used as a porous membrane for blood treatment, a carrier membrane for specific adsorption and the like, and used for a bioreactor, an external circulatory curing device, various artificial organs and the like; and a method for preparing the same, and a filter and a liquid treating module using the same.

2. Description of the Prior Art

As a method for preparing a composite membrane material using a porous membrane as a substrate, it is customary to use a method which comprises coating a porous membrane substrate with a polymer other than one of which the porous membrane substrate is formed.

Heretofore, in a method for preparing a composite porous membrane of this type, as Japanese Patent Disclosure, SHO-62-163703 discloses, a polypropylene porous membrane substrate is prepared by a drawing method and then the substrate is coated with a polydiacetoneacrylamide to obtain a composite membrane. However, this method has drawbacks not only in that the void volume of the composite membrane is decreased by substantially the same volume as that of the coated polydiacetoneamide, thereby leading to a small pore size but also in that when the composite membrane is drawn in order to enlarge the pore size, since a polydiacetoneamide has a high glass transition temperature and the polypropylene porous membrane substrate per se has been prepared by a drawing method so that it is difficult to further sufficiently draw the composite membrane, the composite membrane is likely to be broken, Japanese Patent Disclosure, SHO-62-148667 also discloses a method for preparing a polypropylene porous membrane substrate. However, since a polypropylene porous membrane substrate prepared by this method has an elongation at break of about 10%, it is difficult to draw the polypropylene porous membrane substrate per se.

On the other hand, since hydrophobic porous membranes represented by polyolefin porous membranes have excellent mechanical strength and chemical resistance and do not undergo deformation due to swelling in an aqueous solvent, it is expected to use them in a wide variety of applications. However, as hydrophobic porous membranes are water repellent so that the hydrophobic porous membranes as such are not permeable to water, it is required to render them hydrophilic prior to use. As a method for rendering a hydrophobic porous membrane hydrophilic, there has been proposed a method which comprises forming polymerization starting points on a hydrophobic porous membrane by means of radiation, low temperature plasma, or the like, and supplying a hydrophilic monomer to form a graft polymer on the surface of the membrane (see Japanese Patent Disclosure, SHO-62-262705).

As mentioned above, conventional methods for preparing a porous composite membrane have drawbacks in that the pore size of a composite membrane is likely to become small, and that even if a composite membrane is subjected to drawing with the intention of obtaining a composite membrane having a large void volume and a large pore size, sufficient draw ratio can not be attained.

The above-mentioned method in which a graft polymer is formed on the surface of a membrane to render the membrane hydrophilic is excellent in inhibiting elution and imparting hydrophilic properties to the composite membrane. In the method, however, when a monomer described in Japanese Patent Disclosures, SHO-62-262705 and SHO-59-160504 such as acrylic acid, methacrylic acid or 2-hydroxyethyl methacrylate is used in to prepare a composite membrane, there is a practical problem that the resultant composite membrane is likely to be poor in mechanical strength. That is, physical properties of a particular structure having a high void volume and a small volume of a material portion of the structure, such as a porous membrane greatly vary depending upon the structure and characteristics of graft chains. Therefore, when a polymer having a high glass transition temperature is used to form graft chains on a porous membrane, the resultant porous membrane is brittle, thereby causing problems in handling such as damage in handling and lowering of pressure resistance.

Further, conventional porous composite membranes have a drawback in that when they are implanted in an organism as an artificial organ, they can not adapt their shape to the circumferential tissue so that stress concentrates on the junctional portion and sutural portion, thereby damaging the organism. On the other hand, for example, a polyurethane as a material for a porous membrane has a drawback in that although it has contraction and expansion properties to some extent, when it is implanted in an organism for a long period of time, it undergoes deterioration in the organism so that its physical properties are extremely impaired.

SUMMARY OF THE INVENTION

In this situation, the present invention has been made with a view to overcoming the above-mentioned problems.

It is, therefore, an object of the present invention to provide a porous membrane whose porous membrane substrate is rendered drawable so as to enable the porous membrane to have a large pore size and a void volume and improved performance and physical properties, and a method for preparing the same; and a filter and a liquid treating module.

It is another object of the present invention to provide a porous membrane comprising a hydrophobic porous membrane substrate on the surface of pores of which chains composed of a flexible hydrophilic polymer are strongly held, which is excellent in unbrittleness and inhibiting elution.

It is still another object of the present invention to provide a rubber-like porous composite material having fine through-pores, excellent contraction and expansion properties and adaptability to an organism which have not been attained in conventional porous composite material.

To solve the above-mentioned problems, a porous membrane of the present invention comprises a porous membrane substrate having at least a part of the surface of its pore grafted with a polymer having a glass transition temperature of not more than 300 K. It is preferred that the amount of the polymer be 5 parts by weight or more relative to 100 parts by weight of the porous membrane substrate, and that the porous membrane have pores having a pore size of 0.02 to 10.0 μm, a void volume of 30 to 95%, and an elongation at break of 10% or more when drawn momoaxially. It is also preferred that the polymer having a glass transition temperature of not more than 300 K and be hydrophobic, and that the porous membrane substrate be made of a resin composed mainly of a polyolefin having a glass transition temperature of not more than 300 K, and have a membrane structure of a network structure formed by interconnecting fine particles having a particle diameter of 0.2 to 5.0 μm.

It is preferred that the porous membrane comprises a porous membrane substrate having at least part of the surface of its pore formed with a polymer radical as starting point for polymerization and grafted with a polymer having a glass transition temperature of not more than 300 K.

It is also preferred that the porous membrane comprises a porous membrane substrate having at least part of the surface of its pore formed with a polymer radical as a starting point for polymerization by treatment with a low temperature plasma and grafted with a polymer having a glass transition temperature of not more than 300 K by introducing a gaseous polymerizable monomer under a reduced pressure and non-plasma condition.

The membrane is preferably used as a blood separation membrane separating blood into a component of blood cells and blood plasma.

Since the treatment with a low temperature plasma is a dry process under vacuum condition and using no solvent, it is easy to treat. Additionally, there is no oxygen which is obstructive to polymerization. Therefore, graft polymerization is done very efficiently.

Since the graft polymerization is done under reduced pressure using monomer gas and in a dry process, it is easy to treat and graft polymerization is done very efficiently.

If the polymerization is done under the existence of plasma, plasma polymerization forms. Still more, plasma polymerized membrane is produced and a bridge reaction of the graft chain forms, so graft chains having the desired structure and characteristics cannot be obtained.

It is furthermore preferred that a porous membrane of the present invention comprises:

a porous membrane substrate made of a resin composed mainly of a polyolefin having a glass transition temperature of not more than 300 K, and having a membrane structure of a network structure formed by interconnecting fine particles having a particle diameter of 0.2 to 5.0 μm, and a graft chain formed on the porous membrane substrate in an amount of parts by weight or more relative to 100 parts by weight of the porous membrane substrate, and made of a polymer having a glass transition temperature of not higher than 300 K, wherein the vector element in the direction of the major axis of a segment obtained by connecting the center points of two of the fine particles which are adjacent in the direction of the major axis is longer than the vector element the direction of the minor axis of the segment by 5 μm or more. And also in this case, it is more preferred that the polymer having a glass transition temperature of 300 K is hydrophobic.

A method for preparing a porous membrane of the present invention comprises:

subjecting a porous membrane substrate to plasma treatment at a low temperature, and introducing a gaseous polymerizable monomer under a pressure of 0.1 to 100.0 Torr to form graft chains made of a polymer having a glass transition temperature of not more than 300 K, followed by monoaxial drawing at a temperature higher than the glass transition temperature of the polymer at a draw ratio of 10 to 1000%. It is preferred that the graft chains be formed by graft-polymerizing a hydrophobic polymerizable monomer.

Another porous membrane of the present invention comprises a porous membrane substrate having at least a part of the surface of its pore grafted with a hydrophilic polymer having a glass transition temperature of not more than 300 K. It is preferred that the hydrophilic polymer formed on at least a part of the surface of the pore is comprised mainly of a polymerizable monomer as a recurring unit represented by the formula:

$$CH_2=CH \atop | \atop COO-R_1-O-R_2 \qquad (1)$$

wherein $R_1$ represents $CH_2$, $C_2H_4$, $C_3H_6$ or $C_4H_8$ and $R_2$ represents $CH_3$, $C_2H_5$, $C_2H_4OC_2H_5$, $C_2H_4OCH_3$, $CH_2OC_2H_5$ or $CH_{20}CH_3$.

As specific examples of the hydrophilic polymer, there may be mentioned a polymer comprised mainly of a homopolymer or copolymer of at least one alkoxyalkyl acrylate such as methoxyethyl acrylate and ethoxyethyl acrylate, and a halogenated product thereof.

It is preferred that the hydrophilic polymer formed on at least part of the surface of the pore is methoxyethyl acrylate.

It is preferred that the hydrophilic polymer be formed by graft polymerization of a polymerizable monomer on the surface of the pore of the porous membrane substrate and bonded to the porous membrane substrate by covalent bond, and the porous membrane have an elongation at break of 5% or more and a pore size of $10^{-2}$ μm to $10^2$ μm.

Another method for preparing a porous membrane of the present invention comprises:

subjecting a porous membrane substrate to plasma treatment at a low temperature.

introducing a gaseous polymerizable monomer to advance a graft polymerization reaction at a temperature of not more than 300 K, thereby forming graft chains made of a hydrophilic polymer having a glass transition temperature of not more than 300 K, and washing out the homopolymer as a by-product which is not covalently bonded with a good solvent of the homopolymer.

It is preferred that the polymerizable monomer be represented by the above-mentioned formula (1).

A rubber-like porous composite material of the present invention comprises:

a porous membrane substrate comprising a continuous phase composed of a synthetic polymer, and a polymer having rubber elasticity and disposed on at least a part of the surface of the continuous phase in an amount of 20% by weight or more relative to the weight of the porous membrane substrate.

It is preferred that the rubber-like porous composite have pores having a pore size of 0.02 to 20 μm, a void volume of 20 to 80% and a thickness of 10 μm to 2.0 mm, that the synthetic polymer constituting the porous membrane substrate be comprised mainly of a polyolefin or a halogenated polyolefin and has, at least for part of the surface thereof, a network structure whose linear portion has a thickness of 5 μm or less, and that the synthetic polymer constituting the porous membrane substrate be comprised mainly of a polypropylene or a polyvinylidene fluoride, and the polymer having rubber elasticity comprise monomer units having an unsaturated bond in their molecule and grafted to the porous membrane substrate in an amount of 20% or more relative to the weight of the porous membrane substrate, and the rubber-like porous composite material undergo an elongation set of 10% or less when drawn at an elongation of 50%.

A method for preparing a rubber-like porous composite material of the present invention comprises:

disposing a polymer having rubber elasticity on at least a part of the surface of a continuous phase of a synthetic polymer constituting a porous membrane substrate in an amount of 20% by weight or more relative to the weight of the porous membrane substrate, followed by drawing-relaxation treatment at least one time.

Another method for preparing a rubber-like porous composite material of the present invention comprises:

forming a polymeric radical as a starting point of polymerization on at least a part of the surface of a continuous phase of a synthetic polymer constituting a porous membrane having an elongation at break of less than 50% or undergoing an elongation set of 10% or less when drawn at an elongation of 50%, and causing a monomer having an unsaturated bond in its molecule to come in contact with the polymeric radical to advance polymerization reaction, thereby forming a polymer having rubber elasticity on the porous membrane substrate, followed by drawing-relaxation treatment at least one time to attain an elongation set of 10% or less when drawn at an elongation of 50%.

A filter of the present invention comprises:
a housing having an inlet for a liquid to be filtered and an outlet for a filtrate.
a porous membrane disposed in the housing so as to divide the space in the housing into a compartment for the liquid and a compartment for the filtrate.

A liquid treating module of the present invention comprises:
said porous membrane,
first and second compartments which are separated by the porous membrane.
at least one member selected from the group consisting of an enzyme, a cell of an animal, a cell of a plant, a yeast and a microorganism, and
an inlet for a liquid to be treated to the first compartment and an outlet for a treated liquid from the second compartment,
and that the first compartment be made up of plural small cells.

The liquid treating module of the present invention can be used specially for a bioreactor, an external circulatory curing device, a device for cell culture and the like.

Since the porous membrane of the present invention comprises a porous membrane substrate having thereon polymer chains having a glass transition temperature of not more than 300 K, it is possible to steadily draw the porous membrane at a high draw ratio as compared with an untreated porous membrane substrate, thereby enabling its pores and voids to be enlarged. Consequently, performance of the porous membrane can readily be promoted by enlarging the voids of the porous membrane by drawing. Further, since the glass transition temperature of the polymer chains held on the porous membrane is as low as 300 K, it is possible to impart improved unbrittleness and elongation at break to the porous membrane without impairing physical properties of the porous membrane substrate. These effects are particularly effectively exhibited when the amount of the polymer chains is 5 parts by weight or more relative to 100 parts by weight of the porous membrane substrate.

It is preferred that the porous membrane have pores having a pore size of 0.02 to 10.0 μm, void volume of 30 to 95% and an elongation at break of 10% or more. When the elongation at break is 10% or more, the membrane has high mechanical strength so that the membrane is not easily broken under bending stress and crack seldom occurs, thereby leading to good handling properties. If the glass transition temperature is higher than 300 K, the membrane becomes brittle at room temperature (less than 300 K). When the amount of the polymer is 5 parts by weight or more relative to 100 parts by weight of the porous membrane substrate, the desired physical properties of the polymer as graft chains such as high elongation are sufficiently exhibited. When the pore size is 10 μm or less, physical properties of the membrane become stable. On the other hand, when the pore size is 0.02 μm or more, performance of the membrane as a membrane for separation becomes excellent. When the void volume is 95% or less, physical properties of the membrane an excellent. On the other hand, when the void volume is 30% or more, performance of the membrane is excellent. The term "glass transition temperature" means a temperature at which a polymer chain frozen into glass state initiates molecular motion by heat energy. A glass transition temperature can be measured by means of differential scanning calorimeter (DSC), differential thermal analyzer (DTA) or the like. The drawing may be conducted monoaxially or biaxially. The term "pore size" means a measure of the pore size of through-pores of a membrane. A pore size is determined, for example, as a size such that in filtration experiment using micro-particles of a standard polystyrene latex whose particle size has already been known or a standard protein, 95% or more of the microparticles can not pass through the through-pores. Alternatively, for the convenience's sake, a pore size may be determined as the maximum pore size determined in accordance with the bubble point method described in ASTM-F316. A void volume is calculated by the following formula. Void volume = volume of void(pores)/volume of whole membrane ×100 (%)

The porous membrane substrate is prepared by the phase separation method. In the phase separation method, a starting polymer is dissolved in a solvent or fused, and replacement or removal of the solvent or hardening by cooling is conducted to effect phase separation of the polymer from the solvent or deposition of the polymer, thereby rendering the starting polymer porous. Japanese Patent Disclosure, SHO-62-146308 discloses a drawing method which comprises parting crystals or lamellas by drawing to obtain a porous membrane. However, this method has a drawback in that since the sizes of a crystal and a lamella are limited, it is impossible to prepare a porous membrane having pores of 1 μm or more in pore size without any pinhole. On the other hand, by the phase separation method, a porous membrane having a large thickness can readily be prepared. Accordingly, by drawing the thus prepared porous membrane, it is possible to prepare a porous membrane having pores of 1 μm or more in particle size stably. When a porous membrane prepared by the phase separation method is drawn, it is elongated in the direction of drawing and its thickness tends to become small. Therefore, when a porous membrane has a large thickness, the porous membrane is capable of being drawn at a high draw ratio.

On the other hand, the polymer held on the surface of pores of a porous membrane substrate is preferably grafted to the substrate per se by a pre-irradiation method or simultaneous irradiation method using radiation, ultraviolet, electron radiation or the like. It is preferred that no crosslinking be present between graft chains. The reason for this is that if crosslinking reaction between graft chains takes place to too large an extent, flexibility of a porous membrane is impaired, thereby leading to a difficulty in drawing at high draw ratio. It is preferred that the polymer be a hydrophobic polymer prepared by graft polymerization of a polymerizable monomer according to the plasma-initiated graft polymerization method described below. The plasma-initiated graft polymerization method comprises forming a radical as a starting point for polymerization with a plasma having a low temperature on a porous membrane, for example, a porous membrane made of a polyolefin, and introducing a radical-polymerizable monomer to effect graft polymerization.

A plasma having a low temperature can be generated by a known method, and it is generally generated by exciting a gas with electric energy. The electric energy includes alternating current, direct current and microwave. A system for supplying electric energy may be a capacity connecting system or an introduction current connecting system. In the method, an internal electrode method or an external electrode method may be used.

The hydrophobic polymer is a polymer having a water absorption ratio of 2% or less when immersed in water at 300 K over a period of 24 hours. As the hydrophobic polymer, there may be mentioned a polymethyl acrylate, a polyethyl acrylate, a polybutyl acrylate, a polyhexyl methacrylate, a poly-4-butylstyrene or the like. The hydrophobic polymer as a graft chain may be a block or random copolymer comprising two or more kinds of monomer units, as long as it has a glass transition temperature.

Another porous membrane of the present invention comprises:
 a porous membrane substrate made of a resin composed mainly of a polyolefin having a glass transition temperature of not greater than 300 K, and having a membrane structure of a network structure formed by interconnecting fine particles having a particle diameter of 0.2 to 5.0 μm, and
 a graft chain formed on the porous membrane substrate in an amount of 5 parts by weight or more relative to 100 parts by weight of the porous membrane substrate, and made of a polymer having a glass transition temperature of not higher than 300 K,
 wherein the vector element in the direction of the major axis of a segment obtained by connecting the center points of two of the fine particles which are adjacent in the direction of the major axis is longer than the vector element in the direction of the minor axis of the segment by 5 μm or more. The distance between the center points of the adjacent fine particles in the direction of the major axis i.e. in the direction of the drawing is measured by means of a scanning electron microscope. The polyolefin used in the present invention includes a polyvinylidene chloride and a polyvinylidene fluoride which are respectively a partially chlorinated product and a partially flouridated product, and a chemically modified polyolefin as well as a polyethylene and a polypropylene.

When the diameter of the fine particle constituting a porous membrane of the present invention is more than 5 μm, the physical properties of the membrane becomes poor so that resistance to flexural stress becomes poor. On the other hand, when the diameter of the fine particle is less than 0.2 μm, the pore size of a porous membrane becomes small correspondingly to the size of the fine particles so that it is difficult to form graft chains on the surface of pores of the membrane. When the vector element in the direction of the major axis of a segment obtained by connecting the center points of two of the fine particles which are adjacent in the direction of the major axis is longer than the vector element in the direction of the minor axis of the segment by less than 5 μm, desired characteristics of a drawn membrane such as an enlarged void and an enlarged pore size which lead to improved separation performance can not be obtained sufficiently. When the porous membrane substrate is hydrophobic, the porous membrane does not swell during the use in an aqueous solvent, thereby leading to dimensional stability. When the porous membrane substrate is made of a polyolefin, not only the porous membrane is insusceptible to deterioration by microorganism and deterioration in an organism but also satisfactory results can be obtained in a graft polymerization after application of a plasma or electron rays and in resistance to lowering physical properties. When the glass transition temperature of material for the porous membrane substrate is higher than 300 K, the porous membrane is brittle at room temperature so that it is difficult to draw the porous membrane.

A method for preparing a porous membrane of the present invention comprises:
 subjecting a porous membrane substrate to plasma treatment at a low temperature, and
 introducing a gaseous polymerizable monomer under a pressure of 0.1 to 100.0 Torr to form graft chains made of a polymer having a glass transition temperature of not greater than 300 K, followed by monoaxial drawing at a temperature higher than the glass transition temperature of the polymer at a draw ratio of 10 to 1000%.

In the method, the treatment with plasma having a low temperature is conducted by a known method such as a capacity connecting method or introduction current connecting method using high frequency. The polymerizable monomer is a radical-polymerizable monomer and a graft chain derived from the radical-polymerizable monomer has a glass transition temperature of not more than 300 K. The polymerizable monomer may be used in combination.

In the porous membrane substrate, since a polymer is chemically bonded to the surface of the substrate by graft polymerization, there can be avoided problems inherent in a porous membrane prepared by a coating method or a crosslinking method that cracks are likely to occur on the surface of the coating during drawing or use, and that a polymer formed on a substrate is released from the substrate or dissolved in a solvent during drawing or use. When the graft chain held on the surface of the substrate is a hydrophobic polymer, physical properties of the porous membrane are not lowered in an aqueous solvent or in a moist environment because the porous membrane does not swell even in such circumstance. Further, since the substrate has a network structure formed by interconnecting fine particles, it is possible to obtain a porous membrane having a uniform pore size by enlarging the distance between fine particles.

When the graft polymerization is conducted by plasma-initiated graft polymerization method, not only a substrate is seldom damaged but also an economically advantageous device or system can be used as compared with the case where gamma rays or electron rays are used. In addition, there is an advantage in that continuous graft polymerization can be conducted under reduced pressure with ease. In preparing a porous membrane, since a polymer having a low glass transition temperature is grafted on a porous membrane substrate by the plasma-initiated graft polymerization prior to drawing, a fiber connecting fine particles is reinforced with a graft polymer having a low glass transition temperature, thereby enabling the porous membrane to be drawn at a high draw ratio. As a result, it is possible to obtain a high performance porous membrane having a large void volume, a large pore size and high permeability, as compared with a method using a drawing method as such as to prepare a porous membrane, and a method which comprises preparing a porous membrane by a phase separation method and, without subjecting the porous membrane to graft polymerization, drawing the porous membrane. As opposed to a porous membrane prepared using a coating method or a crosslinking method, since a graft chain is bonded to the substrate by a covalent bond, drawing can stably be conducted without occurrence of a crack and a releasing, thereby enabling a porous membrane to be prepared.

Since the graft polymer is formed by treating a porous membrane substrate with a plasma and then introducing a gaseous polymerizable monomer under reduced pressure of 0.1 to 100.0 Torr, narrow concentration distribution of the polymerizable monomer can be attained so that graft chains are uniformly formed on the surface of the membrane and the surface of pores of the membrane.

In the porous membrane of the present invention, since the hydrophilic polymer held on the surface of pores has a glass transition temperature of not more than 300 K, the hydrophilic polymer is in a rubbery state at room temperature. Accordingly, it is possible to prepare a porous membrane without impairing flexural strength, flexibility and mechanical strengths of the hydrophobic porous membrane as a substrate. On the other hand, since a polymer having a glass transition temperature of higher than 300 K is in a glass state, when it is held on the surface of a hydrophobic porous membrane, the resultant hydrophilic porous membrane is brittle. The reason for this is that although the hydrophobic porous membrane has a satisfactory elongation, the hydrophilic polymer formed on the surface of the membrane is in a glass state, so that the hydrophobic polymer in the vicinity of the surface can not elongate, whereby the hydrophobic polymer can not exhibit original physical properties. As a result, stress is concentrated on a portion capable of being elongated of the hydrophobic polymer as a substrate so that the resultant porous membrane is brittle as compared with the hydrophobic porous membrane as a substrate, thereby impairing mechanical strength of the porous membrane.

"The hydrophobic porous membrane" may have any shape, for example, it may be a hollow fiber membrane, a plane membrane, a tubular membrane or the like, as long as it is hydrophobic and porous. Hydrophobic porous membranes having various pore sizes are used depending upon applications. As an example of hydrophobic porous membrane frequently used, there may be mentioned a hydrophobic porous membrane having a thickness of about 20 $\mu$m to 2 mm, a void volume of about 20 to 90%, a permeability of about $10^{-3}$ to $10^2$ [l/m$^2$·hr·mmHg] which is measured by rendered hydrophilic by an alcohol-water method, and a pore size of about $10^{-2}$ to $10^2$ $\mu$m. It is preferred that the hydrophobic membrane be made of a polymer or copolymer comprised mainly of a polyolefin or a polyolefin having its all or a part of hydrogen atoms substituted with a halogen atom. Of these, a polypropylene and polyvinylidene fluoride are preferred from a viewpoint of easiness of graft polymerization on the surface of the substrate.

In the hydrophilic porous membrane, the hydrophilic polymer is formed on the surface of pores of the substrate in such an amount that an aqueous solvent passes through the pores of the porous membrane under usual osmotic pressure at a permeation flow rate which is acceptable to practical use. Therefore, it is not necessary that the hydrophilic polymer is formed over the entire surface of the pores. It is preferred to use a hydrophilic porous membrane hydrophilized such that when an aqueous solvent to be used is dropped on the porous membrane, the drop penetrates into and passes through the pores of the porous membrane by gravity. Depending on the applications, an agent for hydrophilization such as glycerin and Pluronic may be used.

As the hydrophilic polymer held on the surface of the pores is comprised mainly of an alkoxyalkyl acrylate, it makes a hydrophilic graft chain having a glass transition temperature of not more than 300 K so that the above-mentioned effect is attained. These characteristics are seldom observed in methacrylic polymers and acrylamide polymers. Since the hydrophilic polymer is grafted on the surface of the substrate so that it is bonded to the substrate by covalent bond, there is no danger that when it is used in a solution containing a substance having surface activity or an organic solvent, it is dissolved in the solution. Therefore, the porous membrane can be used as a filter for precise analysis, a filter for medical use which is required to have high safety and the like, as well as various filters for industrial use.

When the porous membrane has an elongation at break of 0.5% or more and a pore size of $10^{-2}$ $\mu$m to $10^2$ $\mu$m, the porous membrane does not become brittle, whereby the porous membrane can be commercialized with ease and readily incorporated into a module, so that productivity can be improved. "The elongation at break" is measured by means of a tensile tester (Strograph T, manufactured by Toyo Seiki K.K., Japan) using a sample having a width of 10 mm at a distance between chucks of 60 mm. When anisotropy is observed in the elongation at break, the smaller value is defined as the elongation at break of the sample.

In the method for preparing a porous membrane, a hydrophobic porous membrane substrate is treated with a plasma having a low temperature to form a polymer radical as a starting point for polymerization. By treatment with a low temperature plasma using a non-polymerizable gas such as argon, an alkyl type radical is generally formed on a polyolefin. It is known that when this alkyl type radical is in contact with oxygen present in a polymer or with oxygen, the radical is converted into a peroxide. The peroxide is cleaved at a temperature of 40° to 50° C. to form two types of starting points for polymerization (a) and (b) shown below, R-OOH—R-O' (a) and 'OH (b)

The radical (a) contributes to graft polymerization, whereas the radical (b) is a causative substance causing the formation of a homopolymer as a by-product. On the other hand, the alkyl type radical which has not been converted into a peroxide directly contributes to graft polymerization. Further, as opposed to the oxyradical, the alkyl type radical contains no ether bond at its bonding site, thereby leading to a resistance to decomposition.

In the method of the present invention, a polymerizable monomer is graft-polymerized at a temperature as low as 300 K or lower so that a majority of polymer radicals as starting points for graft polymerization is alkyl type radicals. In addition, in contrast with polymerization in a liquid phase which uses a solvent, a polymerizable monomer is introduced in a gaseous state so that formation of a homopolymer as a by-product due to chain transfer is diminished. As a result, a hydrophilic polymer is very efficiently graft-polymerized on the surface of the pores of the membrane, thereby enabling a separation membrane having a high performance to be prepared. Further, since the graft is washed with a good solvent, a homopolymer is scarcely dissolved in a solvent or the like during use. Therefore, the porous membrane is highly safe because of its bite resistance and has high added value.

Since the polymerizable monomer to be used in the method for preparing a porous membrane of the present invention includes, as a main ingredient, an alkoxyalkyl acrylate such as methoxyethyl acrylate and ethoxyethyl acrylate, there an advantage which is not attained by a methacrylic derivative or an acrylamide type derivative. That is, as the polymerizable monomer is a liquid at room temperature, it can be supplied to a plasma-treated hydrophobic porous membrane substrate in a gaseous state so that hydrophilic graft chains having a glass transition temperature of not higher than 300 K can be formed efficiently. Further, the polymerizable monomer is readily graft-polymerized on the surface of a polyolefin porous membrane such as a polyvinylidene fluoride or a polypropylene.

The good solvent for washing the graft chains is a solvent in which a homopolymer that is not bonded to the substrate as a hydrophilic polymer constituting a graft chain is dissolved. The graft chains formed on the surface of the pores of the membrane may be modified after treatment to such an extent that physical properties of the porous membrane are not impaired. For example, the graft polymer may be crosslinked to an appropriate extent by heat treatment or using a crosslinking agent.

As the rubber-like porous composite material of the present invention is made using a porous membrane substrate which has been formed into desired shape, the rubber-like porous composite material has finely precise pore size and shape. Since a polymer having a rubber elasticity is held on the surface of a continuous phase of a synthetic polymer constituting a porous membrane substrate, the desired properties of the polymer affect performance of the rubber-like porous composite material, thereby imparting elastic recovery to the porous composite material. Further, when the porous composite material has a network structure whose linear portion has a thickness of 5 μm or less, the porous composite material is flexible and has high elongation. Therefore, since the rubber-like porous composite material of the present invention has sufficient stretchability, when it is implanted in an organism it does not damage the circumferential tissue. Moreover, when the substrate of the rubber-like porous composite material is comprised mainly of a polyolefin, the composite material exhibits adaptability to an organism such that it seldom undergoes deterioration in an organism and scarcely causes inflammation of the circumferential tissue.

In the method for preparing a rubber-like porous composite material, a porous membrane substrate made of a synthetic polymer of which the preparation method has been established by the present inventors is used instead of a rubber which is difficult to be formed into a porous substrate having fine pores, so that it is possible to prepare a rubber-like composite material having fine pores. Further, a polymer having rubber elasticity is held on the surface of the continuous phase of a synthetic polymer constituting a porous membrane substrate, followed by drawing-relaxation treatment so that molecules are rearranged, thereby enabling a structure which exhibits rubber elasticity to be obtained. Furthermore, a polymer radical as a starting point for polymerization is formed on a porous membrane substrate, and a monomer having an unsaturated bond in its molecule comes in contact with the polymer radical to graft a polymer on the surface of the substrate, whereby a polymer having rubber elasticity can uniformly be held on the surface of the substrate in a large amount.

As the polymer substrate to be used in the present invention, any polymer substrates may be used as long as they have suitable mechanical strength and porosity. It is preferred that the polymer substrate be composed mainly of a polyolefin such as a polypropylene or a polyvinylidene fluoride, or a halogenated polyolefin. There is no particular restriction with respect to the polymer having rubber elasticity which is held in the surface of the substrate. However, it is preferred to use an acrylic rubber composed mainly of a polymethyl acrylate or a polyethyl acrylate which comprises monomer units having an unsaturated bond in its molecule and being graft-polymerizable on the surface of the substrate. It is preferred that the polymer be held on the surface of the substrate in an amount of 20% by weight or more relative to the weight of the substrate. If the amount is less than 10% by weight, it is difficult to impart rubber elasticity to the porous composite material sufficiently.

When the rubber-like porous composite material has a pore size of a 20 μm or less and a void volume of 80% or less, it has excellent mechanical strength. On the other hand, when the rubber-like porous composite material has a pore size of 0.02 μm or more and void volume of 20% or more, it has excellent performance as a porous composite membrane. By causing the rubber-like composite material to have an elongation at break of less than 10% or less when drawn at an elongation of 50%, it has excellent dimensional stability and high performance as a rubber-like composite material, thereby enabling it to be used in a wide variety of applications.

"Drawing-relaxation treatment" in the preparation method of the present invention is conducted to promote rearrangement of the molecules, thereby causing rubber elasticity possessed by the polymer to be sufficiently exhibited. The treatment may be conducted irrespective of environmental conditions such as a temperature and medium, as long as the treatment comprises drawing at a degree less than elongation and relaxation (free recovery). This treatment can diminish elongation set of the rubber-like composite material.

In this specification, the words "rubber elasticity" means an elasticity such that when the stretch force to the rubber is released, the rubber is restored to its original state.

In other words, "rubber elasticity" is a rubbery state shown by general high molecular compounds under the temperature range from its glass transition point to the point showing fluidity.

In the preparation method of the present invention, a polymer radical is formed on the surface of a continuous phase of a synthetic polymer constituting a porous membrane substrate, and then a monomer is caused to be in contact with the polymer radical to form a graft chain on the surface of the substrate. There is no particular restriction with respect to the method for forming a polymer radical. As the method for forming a polymer radical, there may be mentioned a method using electron rays, ozone, a plasma, ultraviolet rays, gamma rays or the like. In the grafting a polymer on the surface of the substrate, the introduction of the monomer may be conducted in a gas phase, liquid phase or a combination thereof.

As described above, in the method for preparing a porous membrane of the present invention, a polymer having a low glass transition temperature is held on a porous membrane substrate and then drawing is conducted. Accordingly, the drawing at a high draw ratio can be conducted to which the substrate as such can not be subjected. As a result, not only an excellent porous membrane having an enlarged pore size and an increased void volume can be obtained but also it is possible to control the pore size and the void volume in wide ranges.

Therefore, there is brought about an extremely valuable effect that the porous membrane of the present invention can be used in a wide variety of applications such as a membrane for blood treatment, a carrier membrane for cell culture, a carrier for bioreactor, a filter, a water purifier and various filters for industrial use. Further, since, in the porous membrane of the present invention, a hydrophilic polymer having a glass transition temperature of not higher than 300 K is graft-polymerized on the surface of pores of a porous membrane substrate so that the polymer is bonded to the substrate by a covalent bond, the porous membrane of the present invention is excellent in unbrittleness an inhibiting elution.

As a result, the porous membrane of the present invention can be used in applications in which high safety is required and which is represented by medical filters such as a final filter for infusion solution, various filters for blood, and the like. Further, since the porous membrane of the present invention has excellent chemical resistance and dimensional stability, it can be used as various filters for industrial use and filters for analysis which are used for, e.g., filtration at a high temperature and treatment for a solution containing an organic solvent, a surfactant or the like. Furthermore, by bonding various functional polymers or physiologically active substances to the graft chains formed on the surface of pores of a substrate, it is possible to provide a functional porous membrane having excellent mechanical strength and unbrittleness.

The rubber-like porous composite material is prepared using a porous membrane substrate so that it is possible to readily control its pore size, void volume, and thickness. As a result, many types of rubber-like composite materials having various shapes and functions can be prepared according to the applications. In addition, the rubber-like porous composite material is capable of expansion and contraction and has excellent adaptability to an organism so that when it is implanted in an organism, it does not damage the circumferential tissues, thereby enabling it to be implanted practically. By imparting to the rubber-like porous composite material functions such as selective substance permeation or substance exchange utilizing pores, isolation from different types of cells, or removal and/or release of a drug, it is possible to prepare prostheses and artificial organs using such function-imparted rubber-like composite materials. Further, the rubber-like porous composite material can be used in various applications in which contraction and expansion properties and selective permeability are required simultaneously, such as plaster which is required to have steam permeability, gas permeability, contraction and expansion properties, properties for removal and/or release of a drug, and the like.

DESCRIPTION OF THE PREFERRED EMBODIMENTS

Embodiments of the present invention will be described in more detail with reference to the drawings. However, the present invention is by no means restricted to the Embodiments.

Embodiments 1 to 4

To 100 parts by weight of a mixture of polypropylene having a melt flow index of 30 and polypropylene having a melt flow index of 0.3 (weight ratio, 100:40) were added 400 parts by weight of liquid paraffin (number average molecular weight, 324) and 0.3 part by weight of 1,3,2,4,-bis(p-ethylbenzylidene)sorbitol as a nucleating agent. The resultant mixture was melt-kneaded and pelletized by means of a twin-screw extruder to obtain pellets. Using the above extruder, the pellet was melted at a temperature of 150° to 200° C., extruded from a T-die having a slit of 0.6 mm, introduced into a cooling and hardening liquid by rotation of a guide roller of a cooling liquid bath placed right under the T-die, and wound up after hardening by cooling. The wound up film-shaped product was cut into the predetermined size to obtain sheets having the same size. The sheets were fixed along the longitudinal direction and lateral direction, and immersed in 1,1,2-trichloro-1,2,2-trifluoroethane for ten minutes. The immersion was repeated four times to extract liquid paraffin, followed by heat treatment in air having a temperature of 135° C. for 2 minutes to obtain porous membrane substrates of polypropylene having a pore size of 0.3 μm and thickness of 170 μm.

The thus obtained porous membrane substrates were irradiated with a plasma having a low temperature (Ar: 0.1 Torr) for 10 seconds, and then pressure was reduced to 0.01 Torr. Thereafter, each of the porous membrane substrates was subjected to graft polymerization under each of four conditions indicated in Table 1 to form graft chains having a glass transition temperature of not more than 300 K on the surface of the porous membrane substrate, thereby obtaining a porous membrane. The porous membranes obtained under the four conditions were referred to as the porous membrane of Embodiments 1,2,3 and 4, respectively. Each of the porous membranes was washed with a solvent (Resisolve, produced by Asahi Glass K.K., Japan) for two days, and then dried to obtain a porous membrane whose surface and surface of the pores are grafted with polymer chains having a glass transition temperature of not more than 300 K in an amount of 5 parts by weight or more. The porous membrane was drawn by means of a hand-operated drawing machine to measure the maximum draw ratio. The results shown in Table 1 were obtained. As is apparent from the results, each of the porous membrane showed high maximum draw ratio as compared with an ungrafted porous membrane substrate.

Comparative Examples 1 to 4

A porous membrane substrate of polypropylene prepared in the same manner as in Embodiment 1 per se, which is not from graft chains, is used in Comparative Example 1. Using the same porous membrane substrates as used in Comparative Example 1, plasma-initiated graft polymerization was conducted in the same manner as in Embodiment 1 except that conditions of the graft polymerization were changed to those indicated in Table 1 to form graft chains having a glass transition temperature higher than 300 K on the surface of the substrate, thereby obtaining porous membranes of Comparative Example 2,3 and 4. The maximum draw ratio of each of the porous membrane substrate and the porous membranes was measured. The results are shown in Table 1. As is apparent from Table 1, each of the porous membrane substrates and the porous membranes showed low maximum draw ratio.

Embodiments 5 and 6

A solution prepared by dissolving 18 parts by weight of polyvinylidene fluoride powder (Kynar K301, produced by Mitsubishi Yuka K.K.) in 73.8 parts by weight of acetone and 8.2 parts by weight of dimethylformamide was cast over polyethylene terephthalate films, and the resultant films were immersed in a 1,1,2-trichloro-1,2,2-trifluoroethane bath for 5 minutes and then dried to obtain porous membrane substrates of polyvinylidene fluoride having a thickness of 165 μm and an average pore size of 0.45 μm.

The thus obtained porous membrane substrates were subjected to plasma-initiated graft polymerization in the same manner as in Example 1 to form graft chains having a glass transition temperature of not more than 300 K on the porous membrane substrates. The maximum draw ratio of each of the thus obtained porous membrane was measured. The results are shown in Table 2. As is apparent from Table 2, good results were obtained. In Embodiment 5, methyl acrylate (Tg=283 K) was used as a monomer. In Embodiment 6, ethyl acrylate (Tg=249 K) was used as a monomer.

Comparative Examples 5 to 7

Using porous membrane substrates of polyvinylidene fluoride prepared in the same manner as in Embodiment 1, plasma-initiated graft polymerization was conducted in the same manner as in Embodiment 1 except that conditions of the graft polymerization were changed to those indicated in Table 2 to form graft chains having a glass transition temperature higher than 300 K on the surface of the substrate, thereby obtaining porous membranes. In Comparative Example 5, ethyl methacrylate (Tg=338 K) was used as a monomer. In Comparative Example 6, N,N-dimethylacrylamide (Tg=362 K) was used as a monomer. In Comparative Example 7, a porous membrane substrate of polypropylene prepared in the same manner as in Embodiment 1 per se, which is ungrafted, is used. The maximum draw ratio of each of the porous membrane substrate and the porous membranes was measured. The results are shown in Table 2. As is apparent from Table 2, each of the porous membrane substrate and the porous membranes showed low maximum draw ratio.

Embodiments 7 and 8, and Comparative Example 8 and 9

Porous membrane substrates having a pore size of 0.6/ μm and a thickness of 180/ μm were prepared in the same manner as in Embodiment 1 except that 100 parts by weight of polypropylene (J3H, produced by Mitsui Toatsu K.K.) and 60 parts by weight of ethylene-propylene randompolymer (GEBG, produced by Mitsui Toatsu K.K.) were used instead of the polypropylene mixture.

The porous membrane substrates were irradiated with electron rays by means of an electron accelerator (electric voltage, 1.5 Me; electric current of an electron gun, 1 mA), and then, in a deoxygenated sealed vessel, a gaseous monomer was introduced and caused to fill the vessel to effect surface graft polymerization, thereby obtaining porous membranes. In Embodiment 7, graft polymerization was conducted for 4 minutes. In Embodiment 8, graft polymerization was conducted for 20 minutes. In Comparative Example 8, the porous membrane substrate per se as was used. In Comparative Example 9, a porous membrane comprising the porous membrane substrate and graft chains formed on the substrate and having a glass transition temperature higher than 300 K.

The glass transition temperature of the monomers and the maximum draw ratio of each of the porous membrane substrate and the porous membranes was measured. The results are shown in Table 3.

Embodiments 9 to 11 and Comparative Examples 10 and 11

Using porous membranes of the present invention which have been drawn (Embodiments 9 to 10), a porous membrane of the present invention which has not been drawn (Comparative Example 10) and a porous membrane substrate per se (Comparative Example 11), water permeability and function for blood plasma separation of the porous membranes and the porous membrane substrate were measured. The results are shown in Table 4. The function for blood plasma separation was evaluated by measuring the amount of separated blood plasma from bovine blood by means of a small module of 24 cm$^2$ at a shear rate of 300 cm$^{-1}$. The maximum pore size (D) was determined by the bubble point (BP) method. It is apparent from the results that porous membranes of Embodiments 9 to 11 exhibited excellent performance as compared with the porous membrane of Comparative Example 10 and the porous membrane substrate of Comparative Example 11.

Embodiment 12

Figure 1:
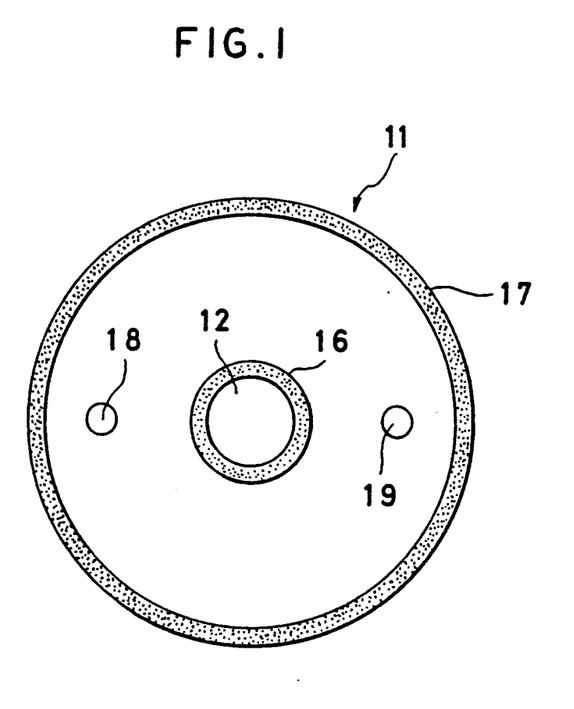
FIG. 1 is a plan view showing a structure of a plane filter using the porous membrane according to Example of the present invention.
Figure 2:
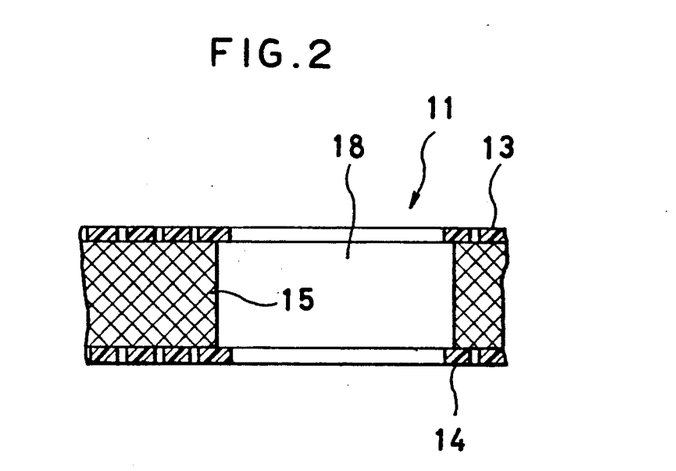
FIG. 2 is a partial enlarged sectional view of the structure of the plane filter shown in FIG. 1.

An external circulatory curing device was prepared using a plane filter 11 as shown in FIG. 1. FIG. 2 shows a partial enlarged section of the filter 11. The plane filter 11 has a through hole 12 so that it has a doughnut-like shape. The filter 11 was prepared by interposing a woven fabric having a coarse weave pattern 15 between two porous membrane of the present invention 13 and 14, and sealing the inner circumference and the outer circumference with heat-sealing members 16 and 17. The woven fabric having a coarse weave pattern 15 has function as a gap-maintaining member for maintaining the gap between the porous membranes 13 and 14 as a path for a fluid. In order to cause a fluid to be circulated through the path for a liquid, two through holes 18 and 19 were formed. When a number of the plane filter 11 is accommodated in a suitable housing, a blood circulating path is defined outside the filter and a gel holding space is defined inside the filter. Accordingly, when an enzyme is immobilized on the inner surface of the filter and blood is circulated through the blood circulating path defined outside the filter, the intended reaction can be effected efficiently. It is also possible to define a blood circulating path inside the filter and a get holding space outside the filter.

Embodiment 13

A bioreactor was prepared using a plane filter 11 as shown in FIGS. 1 and 2. The plane filter 11 has the same structure as that of the plane filter used in Embodiment 12. Therefore, explanation with respect to the structure is omitted here. When a number of the plane filter 11 is accommodated in a suitable housing, a path for a solution to be reacted is defined outside the filter and a space for reaction is defined inside the filter. Accordingly, when an enzyme, cells of a plant or an animal, yeast, a fungi or a mixture thereof is immobilized on the inner surface of the filter and a solution to be reacted is circulated through the path for a solution to be reacted defined outside the filter or when a carrier on which the above-mentioned enzyme or the like is immobilized is sealed in the filter and a solution to be reacted is circulated through the space for reaction defined outside the filter, the intended reaction can be effected efficiently. Further, also in the bioreactor, it is possible to define a path a solution to be reacted inside the filter and a space for reaction outside the filter.

Embodiments 14 to 17

To 100 parts by weight of a mixture of polypropylene having a melt flow index of 30 and polypropylene having a melt flow index of 0.3 (weight ratio, 100:40) were added 400 parts by weight of liquid paraffin (number average molecular weight, 324) and 0.3 part by weight of 1,3,2,4,-bis(p-ethylbenzylidene)sorbitol as a nucleating agent. The resultant mixture was melt-kneaded and pelletized by means of a twin-screw extruder to obtain pellets. Using the above extruder, the pellets were melted at a temperature of 150° to 200° C., extruded from a T-die having slit of 0.6 mm, introduced into a cooling and hardening liquid by rotation of a guide roller of a cooling liquid bath placed right under the T-die, and wound up after hardening by cooling. The wound up film-shaped product was cut into the predetermined size to obtain sheets having the same size. The sheets were fixed along the longitudinal direction and lateral direction, and immersed in 1,1,2-trichloro-1,2,2-trifluoroethane for ten minutes. The immersion was repeated four times to extract liquid paraffin, followed by heat treatment in air having a temperature of 135° C. for 2 minutes to obtain porous membrane substrates of polypropylene having a pore size of 0.6 μm and thickness of 130 μm.

The thus obtained porous membrane substrates were irradiated with a plasma having a low temperature (Ar: 0.1 Torr) for 10 seconds, and then pressure was reduced to 0.001 Torr. Thereafter, each of the porous membrane substrates was subjected to graft polymerization at 288 K, thereby obtaining a porous membrane. Each of the porous membranes was washed with a solvent (Resisolve, produced by Asahi Glass K.K., Japan) for two days, and then dried to obtain a hydrophilic porous membrane whose surface and surface of the pores are grafted with polymer hydrophilic chains having a glass transition temperature (Tg) of not more than 300 K. The thus obtained porous membranes are referred to as porous membrane of Embodiments 14,15,16, and 17 according to the types of the monomers and the glass transition temperatures (Tg) as shown in table 5. As is apparent from Table 5, each of the porous membrane has good drawability and satisfactory unbrittleness.

Embodiment 18

A porous membrane substrate having a pore size of 0.6 μm and a thickness of 120 μm was prepared in the same manner as in Embodiment 14 except that 100 parts by weight of polypropylene (J3H, produced by Mitsui Toatsu K.K.) and 60 parts by weight of ethylene-propylene randompolymer (GEBG, produced by Mitsui Toatsu K.K.) were used instead of the polypropylene mixture.

The porous membrane substrate was irradiated with electron rays by means of an electron accelerator (electric voltage, 1.5 Me; electric current of an electron gun, 1 mA), and then, in a sealed vessel from which oxygen gas had been removed, a gaseous methoxethyl acrylate was introduced and caused to fill the vessel to effect graft polymerization at 20° C., thereby obtaining the intended porous membrane. The results are shown in Table 5.

Comparative Examples 12 to 19

Using porous membrane substrates of polypropylene prepared in the same manner as in Embodiment 14, graft polymerization was conducted in the same manner as in Embodiment 14 except that monomers were changed to those indicated in Table 5 to form hydrophilic graft chains having a glass transition temperature higher than 300 K on the surface of the substrate, thereby obtaining hydrophilic porous membranes. The thus obtained porous membranes are referred to as porous membranes of Comparative Examples 12 to 19 according to the types of the monomers and the glass apparent from Table 5, the porous membranes had low elongation at break and were brittle. It is also apparent from Table 5, although the porous membranes having graft chains having a glass transition temperature of not more than 300 K, i.e., the porous membrane having polymethyl acrylate graft chains (Comparative Example 18) and the porous membrane having polyethyl acrylate graft chains (Comparative Example 19) had sufficient drawability, they were not hydrophilic.

Embodiments 19 to 21

A solution prepared by dissolving 18 parts by weight of polyvinylidene fluoride powder (Kynar K301, produced by Mitsubishi Yuka K.K.) in 73.8 parts by weight of acetone and 8.2 parts by weight of dimethylformamide was cast over polyethylene terephthalate films, and the resultant films were immersed in a 1,1,2-trichloro-1,2,2-trifluoroethane bath for 5 minutes and then dried to prepare porous membrane 115 μm and an average pore size of 0 45 μm.

The thus prepared porous membrane substrates were subjected to graft polymerization in the same manner as in Embodiment 14 to obtain porous membranes. The thus obtained porous membranes are referred to as porous membrane of Embodiments 19, 20 and 21 according to the types of the monomers and the glass transition temperatures (Tg) as shown in Table 6. With respect to the porous membranes, various properties were measured The results are shown in Table 6.

Comparative Examples 20 to 23

Using porous membrane substrates of polyvinylidene fluoride prepared in the same manner as in Embodiment 19, graft polymerization was conducted in the same manner as in Embodiment 14 except that various monomers as shown in Table 6 were used to form graft chains on the surface of the substrate, thereby obtaining porous membranes The thus obtained porous membranes are referred to as porous membranes of Comparative Examples 20 to 23 according to the types of the monomers and the glass transition temperatures (Tg) as shown in Table 6. As is apparent from Table 6, the desired porous membrane could not be obtained.

Embodiments 22 and 23 and Comparative Example 24

Using porous membrane substrates of polypropylene prepared in the same manner as in Embodiment 14, graft polymerization was conducted in the same manner as in Embodiment 14 except that temperatures for the graft polymerization were changed, thereby obtaining porous membranes. The temperatures for the graft polymerization in Embodiment 22, Embodiment 23 and Comparative Example 24 were 277 K, 288 K and 323 K, respectively.

When the temperature for the graft polymerization was too high, graft efficiency was lowered. As a result, when the resultant porous membrane was used without being subjected to washing, a homopolymer as a by-product in the graft polymerization was dissolved in the environmental liquid in a large amount, thereby leading to a practical problem. The results are shown in Table 7.

Embodiments 24 to 29

To 100 parts by weight of a mixture of polypropylene having a melt flow index of 30 and polypropylene having a melt flow index of 0.3 (weight ratio, 100:40) were added 400 parts by weight of liquid paraffin (number average molecular weight, 324) and 0.3 parts by weight of 1,3,2,4,-bis(p-ethylbenzylidene)sorbitol as a nucleating agent. The resultant mixture was melt-kneaded and pelletized by means of a twin-screw extruder to obtain pellets. Using the above extruder, the pellets were melted at a temperature of 150° to 200° C., extruded from a T-die having a slit of 0.6 mm, introduced into a cooling and hardening liquid by rotation of a guide roller of a cooling liquid bath placed right under the T-die, and wound up after hardening by cooling. The wound up film-shaped product was cut into the predetermined size to obtain sheets having the same size. The sheets were fixed along the longitudinal direction and lateral direction, and immersed in 1,1,2-trichloro-1,2,2-trifluoroethane for ten minutes. The immersion as repeated four times to extract liquid paraffin, followed by heat treatment in air having a temperature of 135° C for 2 minutes to obtain porous membrane substrates of polypropylene having a pore size of 0.65 μm and thickness of 120 μm.

The thus obtained porous membrane substrates were irradiated with a plasma having a low temperature (Ar: 0.1 Torr) for 10 seconds, and then pressure was reduced to 0.001 Torr. Thereafter, each of the porous membrane substrates was subjected to graft polymerization by introducing a monomer having an unsaturated bond in its molecule under each of conditions indicated in Table 8 to obtain a porous membrane comprising a porous membrane substrate, and a polymer having rubber elasticity and formed on at least a part of the surface of the continuous phase composed of a synthetic rubber constituting the porous membrane substrate.

The porous membrane was cut into strips having a width of 1 cm. The strips were subjected to drawing-relaxation treatment at room temperature 30 times to obtain rubber-like porous composite materials. With respect to each of the rubber-like porous composite materials, elongation set when drawn at a draw ratio of 100% was measured. As a result, each of the rubber-like porous composite materials was found to be less than 10% in elongation set when drawn at a draw ratio of 50%.

Comparative Examples 25 to 28

Using porous membrane substrates of polypropylene prepared in the same manner as in Embodiment 24, graft polymerization was conducted in the same manner as in Embodiment 24 except that conditions were changed to those indicated in Table 8 to obtain porous composite material (Comparative Examples 26 to 28). In Comparative Example 25, the porous membrane substrate per se was used. The porous membrane composite materials whose substrates were grafted with a polymer having rubber elasticity in a small amount had insufficient rubber elasticity. The porous composite material which was not subjected to drawing-relaxation, and the porous membrane substrate which did not hold a polymer also had insufficient rubber elasticity.

Embodiments 30 and 31

A solution prepared by dissolving 18 parts by weight of polyvinylidene fluoride powder (Kynar K301, produced by Mitsubishi Yuka K.K.) in 73.8 parts by weight of acetone and 8.2 parts by weight of dimethylformamide was cast over polyethylene terephthalate films, and the resultant films were immersed in a 1,1,2-trichloro-1,2,2-trifluoroethane bath for 5 minutes and then dried to obtain porous membrane substrates of polyvinylidene fluoride having a thickness of 100 μm and an average pore size of 0.45 μm.

The thus obtained porous membrane substrates were subjected to graft polymerization and drawing-relaxation treatment in the same manner as in Embodiment 24 except that conditions of the graft polymerization were changed to those indicated in Table 8 to obtain rubber-like porous composite materials.

Comparative Examples 29 to 31

Porous membrane substrates of polyvinylidene fluoride were prepared in the same manner as in Embodiment 30. The porous membrane substrate per se was evaluated in Comparative Example 29. The porous membrane substrate was subjected to graft polymerization and drawing-relaxation treatment in the same manner as in Embodiment 30 except that conditions of the graft polymerization were changed to those indicated in Table 8 to obtain rubber-like porous composite materials whose substrate was grafted with a polymer having rubber elasticity in a small amount (Comparative Example 30). The porous membrane substrate was subjected to graft polymerization but not subjected to drawing-relaxation treatment (Comparative Example 31). Each of these porous products had insufficient rubber elasticity.

Embodiment 32

A porous membrane substrate having a pore size of 0.6 μm and a thickness of 180 μm was prepared in the same manner as in Embodiment 24 except that 60 parts by weight of polypropylene (J3H, produced by Mitsui Toatsu K.K.) and 100 parts by weight of ethylene-propylene randompolymer (GEBG, produced by Mitsui Toatsu K.K.) were used instead of the polypropylene mixture.

The porous membrane substrate was irradiated with electron rays by means of an electron accelerator (electric voltage, 1.5 Me; electric current of an electron gun, 1 mA), and then, in a sealed vessel from which oxygen gas had been removed, a gaseous ethyl acrylate was introduced and caused to fill the vessel to effect graft polymerization, followed by drawing (draw ratio, 200%)-relaxation treatment 10 times to obtain a rubber-like composite material.

Embodiments 33 and 34

Each of the rubber-like porous composite materials obtained in Embodiments 26 and 27 was hypodermically implanted in a dorsum of a rat. One month later, each of them was taken out and evaluated histologically. As result, no particular allotrylic reaction was observed in each case. Each of the rubber-like porous composite material was found to have excellent compatibility with an organism.

In the above-described Examples, explanations are made with respect to the embodiments in which a porous membrane of the present invention is used for an external circulatory curing device and a bioreactor. However, it is of course possible to use the porous membrane of the present invention as a matrix of artificial organs and prosthesis such as an artificial blood vessel and an artificial tendon, and a basement membrane for a cell. It is also possible to use the porous membrane of the present invention for water purifier and the like.

TABLE 1

|  |  | Monomer (Tg) | Time for graft polymerization (min) | Pressure for graft polymerization (Torr) | Graft ratio (%) | Maximum draw ratio (%) |
|---|---|---|---|---|---|---|
| Embodiment | 1 | Methyl acrylate (T = 283K) | 3.0 | 4.0 | 23.6 | 47 |
|  | 2 | Methyl acrylate (Tg = 283K) | 6.0 | 4.0 | 54.8 | 92 |
|  | 3 | Methyl acrylate (Tg = 283K) | 15.0 | 4.0 | 112.3 | 236 |
|  | 4 | Ethyl acrylate (Tg = 249K) | 6.0 | 4.0 | 22.7 | 42 |
| Comparative Example | 1 | (Substrate per se) | — | — | — | 16 |
|  | 2 | Ethyl methacrylate (Tg = 338K) | 6.0 | 4.0 | 25.3 | 8 |
|  | 3 | Ethyl methacrylate (Tg = 338K) | 10.0 | 4.0 | 48.9 | 6 |
|  | 4 | N,N-dimethylacrylamide (Tg = 362K) | 6.0 | 0.8 | 22.7 | 4 |

The graft ratio is calculated by the following formula, $$\text{graft ratio} = \frac{W_g}{W_o} \times 100 \, (\%)$$

where Wg represents the weight of the grafted polymer and Wo represents the weight of the substrate.

TABLE 2

|  |  | Monomer (Tg) | Time for graft polymerization (min.) | Graft ratio (%) | Maximum draw ratio (%) |
|---|---|---|---|---|---|
| Embodiment | 5 | Methyl acrylate (Tg = 283 K) | 20.0 | 137.1 | 463 |
|  | 6 | Ethyl acrylate (Tg = 249 K) | 20.0 | 91.2 | 217 |
| Comparative | 5 | Ethyl methacrylate (Tg = 338 K) | 20.0 | 87.6 | 11.0 |
|  | 6 | N,N-dimethylacrylamide | 20.0 | 62.0 | 9.2 |

TABLE 2-continued

|  | Monomer (Tg) | Time for graft polymerization (min.) | Graft ratio (%) | Maximum draw ratio (%) |
|---|---|---|---|---|
|  | (Tg = 362 K) |  |  |  |
| 7 | (Substrate per se) | — | — | 22.6 |

TABLE 3

|  |  | Monomer (Tg) | Time for graft polymerization (min.) | Graft ratio (%) | Maximum draw ratio (%) |
|---|---|---|---|---|---|
| Embodiment | 7 | Methyl acrylate (Tg = 283 K) | 4.0 | 49.7 | 116 |
|  | 8 | Methyl acrylate (Tg = 283 K) | 20.0 | 212 | 472 |
| Comparative Example | 8 | (Substrate per se) | — | — | 24.7 |
|  | 9 | Methyl methacrylate (Tg = 311 K) | 10.0 | 67.3 | 5.2 |

TABLE 4

|  |  | Monomer (Tg) | Graft ratio (%) | Draw ratio (%) | Void volume (%) | Amount of permeated water ml/min · cm² · mmHg | Blood plasma separating performance | Maximum diameter D (μm) |
|---|---|---|---|---|---|---|---|---|
| Embodiment | 9 | Methyl acrylate (Tg = 283 K) | 33.7 | 15 | 70 | 247 | 0.28 | 0.69 |
|  | 10 | Methyl acrylate (Tg = 283 K) | 33.7 | 30 | 73 | 319 | 0.33 | 0.74 |
|  | 11 | Methyl acrylate (Tg = 283 K) | 33.7 | 50 | 75 | 443 | 0.35 | 0.80 |
| Comp. Ex. | 10 | Methyl acrylate (Tg = 283 K) | 33.7 | 0 | 67 | 203 | 0.23 | 0.66 |
|  | 11 | (Substrate per se) | — | — | 71 | 211 | 0.23 | 0.67 |

TABLE 5

|  |  | Monomer | Tg [K] | Graft ratio (%) | Hydrophilicity | Elongation at break (%) |
|---|---|---|---|---|---|---|
| Embodiment | 14 | Methoxyethyl acrylate | 223 | 8.4 | + | 9.1 |
|  | 15 | Methoxyethyl acrylate | 223 | 32.3 | + | 18.3 |
|  | 16 | Ethoxyethyl acrylate | 222 | 7.8 | + | 10.8 |
|  | 17 | Ethoxyethoxyethyl acrylate | 238 | 9.8 | + | 9.6 |
|  | 18 | Methoxyethyl acrylate | 223 | 13.4 | + | 8.1 |
| Comp. Ex. | 12 | Dimethylacrylamide | 362 | 12.1 | + | 4.4 |
|  | 13 | Acrylic acid | 379 | 9.7 | +[*1] | 2.7 |
|  | 14 | Methacrylic acid | 501 | 7.2 | +[*1] | 2.0 |
|  | 15 | Methyl methacrylate | 311 | 16.4 | − | 3.7 |
|  | 16 | Ethyl methacrylate | 338 | 21.4 | − | 2.8 |
|  | 17 | 4-vinylpyridine | 436 | 9.5 | +[*2] | 2.5 |
|  | 18 | Methyl acrylate | 238 | 23.6 | − | 27.0 |
|  | 19 | Ethyl acrylate | 249 | 22.7 | − | 32.0 |

Note
[*1] Measured after its graft chain being converted into a sodium salt
[*2] Measured after its graft chain being quarternized with bromoethane

TABLE 6

|  |  | Monomer | Tg [K] | Graft ratio (%) | Hydrophilicity | Elongation at break (%) |
|---|---|---|---|---|---|---|
| Embodiment | 19 | Methoxyethyl acrylate | 223 | 14.3 | + | 12.1 |
|  | 20 | Ethoxyethyl acrylate | 222 | 8.9 | + | 10.3 |
|  | 21 | Ethoxyethyl acrylate | 238 | 7.2 | + | 8.6 |
| Comp. Ex. | 20 | Methacrylic acid | 501 | 7.7 | +[*1] | 3.8 |
|  | 21 | Dimethylacrylamide | 362 | 18.3 | + | 4.2 |
|  | 22 | 4-vinylpyridine | 436 | 8.2 | +[*2] | 2.8 |
|  | 23 | Methyl acrylate | 283 | 16.7 | − | 17.6 |

Note
[*1] Measured after its graft chain being converted into a sodium salt.
[*2] Measured after its graft chain being quarternized with bromoethane.

TABLE 7

| | | Monomer | Reaction temperature (K) | Graft efficiency (%) |
|---|---|---|---|---|
| Embodiment | 22 | Methoxyethyl acrylate | 277 | 96.2 |
| | 23 | Methoxyethyl acrylate | 288 | 92.7 |
| Comp. Ex. | 24 | Methoxyethyl acrylate | 323 | 67.2 |

Definition
Hydrophilicity: Hydrophilicity was classified as (+) when the membrane satisfied the standard that when water is dropped on the surface of the membrane at room temperature (20 ± 5° C.), the drop penetrates into pores and reaches the other surface of the membrane in 5 minutes by gravity.
Graft Ratio: Wg/Wo × 100 (%)
Graft efficiency: Wg/(Wg + Wh) × 100 (%)
Wo: the weight of the substrate
Wg: the weight of the grafted polymer
Wh: the weight of the homopolymer as a by-product

TABLE 8

| | | Monomer | Conditions for graft polymerization | Amount of polymer held on substrate (%) | Maximum diameter (μm) | Void volume (%) | Elongation set (%) |
|---|---|---|---|---|---|---|---|
| Embodiment | 24 | Ethyl acrylate | 4 torr–20 min | 79 | 0.60 | 63 | 3.8 |
| | 25 | Ethyl acrylate | 4 torr–40 min | 138 | 0.45 | 47 | 1.3 |
| | 26 | Methyl acrylate | 4 torr–40 min | 150 | 0.43 | 45 | 2.2 |
| | 27 | Methyl acrylate Ethyl acrylate | 4 torr–10 min 4 torr–40 min | 156 | 0.40 | 44 | 1.0 |
| | 28 | Ethyl acrylate Methoxyethyl acrylate | 4 torr–40 min 1 torr–10 min | 152 | 0.40 | 45 | 1.8 |
| | 29 | Ethyl acrylate 4-vinylpyridine | 4 torr–40 min 2 torr–10 min | 143 | 0.46 | 47 | 2.7 |
| | 30 | Ethyl acrylate | 4 torr–30 min | 96 | 0.38 | 66 | 4.3 |
| | 31 | Ethyl acrylate Methoxyethyl acrylate | 4 torr–40 min 1 torr–10 min | 133 | 0.25 | 55 | 2.8 |
| | 32 | Ethyl acrylate | 60 min | 178 | 0.12 | 46 | 2.2 |
| Comp. Ex. | 25 | (Substrate per se) | — | — | 0.65 | 73 | *1 |
| | 26 | Methyl acrylate | 4 torr–3 min | 17 | 0.65 | 70 | *1 |
| | 27 | Ethyl acrylate | 4 torr–3 min | 16 | 0.64 | 69 | *1 |
| | 28 | Ethyl acrylate (Drawing-relaxation treatment was omitted) | 4 torr–40 min | 138 | 0.43 | 45 | 38 |
| | 29 | (Substrate per se) | — | — | 0.45 | 76 | *1 |
| | 30 | Ethyl acrylate | 4 torr–3 min | 18 | 0.45 | 73 | *1 |
| | 31 | Ethyl acrylate (Drawing-relaxation treatment was omitted) | 4 torr–40 min | 133 | 0.23 | 52 | 44 |

*In the Examples where two types of monomers were used, the monomer shown in the upper row was first graft-polymerized and then the monomer shown in the lower row was graft-polymerized on the substrate.
*The maximum diameter was measured by the bubble point method.
*1: Elongation set could not be measured since the test sample had an elongation at break of 50% or less.

Embodiment 35

With a twin-screw type extruder (produced by Ikegai Iron Works, Ltd. and marketed under product code of "PCM-30-25"), 100 parts by weight of a mixture of two species of polypropylene having melt indexes of 30 and 0.3 (mixing ratio 100 : 30 by weight), 400 parts by weight of liquid paraffin (number average molecular weight 324), and 0.3 parts by weight of 1,3,2,4-bis(p-ethylbenzylidene)sorbitol as a crystal seed-forming agent were melted, kneaded, and pelletized. In the same extruder, the pellets were melted at a temperature in the range of 150° to 200° C., extruded through a T-die 0.6 mm in slit width into the ambient air, allowed to fall onto a guide roller of a cooling liquid tank installed directly below the T die, allowed to be led into the cooling and solidifying liquid polyethylene glycol in the tank by virtue of rotation of the roller to be cooled and so solidified therein, and then taken up in a roll. The cooling and solidifying liquid and the temperature thereof were varied as indicated in Table 1. The rolled film was cut into fixed lengths (about 200 × 200 mm). A cut piece of film, fixed in both the longitudinal and lateral directions, was immersed a total of four times each for 10 minutes in 1,1,2-trichloro-1,2,2-trifluoroethane (kept at 25° C.) to extract the liquid paraffin and then subjected to two minutes heat treatment in the air at 135° C.

The porous hydrophobic polypropylene membrane thus obtained was irradiated with a low-temperature plasma (argon 0.1 torr) for 10 seconds and, with the pressure of the enveloping air lowered to 0.01 torr, methoxyethyl acrylate was supplied and caused to react upon the membrane at 25° C. for five minutes under the non-existence of low temperature plasma and graft chains were grown. The membrane which had undergone this treatment was washed with methanol/dichloromethane azeotropic mixture solvent and then dried, to obtain a porous 30 hydrophilic polypropylene membrane having poly(methoxyethyl acrylate) bonded to the surfaces thereof an the surfaces of pores formed therein.

Comparative Examples 32 and 33

A polypropylene porous membrane possessing a pore diameter of 0.3 μm, having a thickness of 170 μm and possessing the same membrane structure as that of Embodiment 35 and having no graft chains bonded to the surfaces of membrane or to the surfaces of pores in the membrane was used in comparative Examples 32 and a cellulose acetate membrane (produced by Toyo Roshi Company), a porous hydrophilic membrane possessing a pore diameter roughly equal to that of the membrane of Embodiment 35 was used in Comparative Example 33.

The porous hydrophilic polypropylene membrane is obtained as described above. The uses to be found for this membrane include a blood plasma separation membrane for the separation of blood into a component of blood cells and blood plasma and a microfilter for the removal of microorganisms from blood, for example. It is used particularly advantageously as a blood plasma separation membrane in applications such as donor plasmapheresis which effective use of blood plasma to be separated or for therapy of immunodisease.

The membrane which is obtained as described above is employed for a varying use, depending on the particular attributes of the membrane body in terms of permeation. It manifests an outstanding performance particularly when it is incorporated as a blood plasma separation membrane in a module.

Blood Plasma Separation Experiment

These porous blood plasma separation membranes were subjected to an in vitro test for blood plasma separation using human blood. As an index of the recovery of a coagulating factor in the filtered blood plasma, the ratios of recovery of fibrinogens F, VIII: C were determined. As an index of the activation of the complemental system, the $C_{3a}$ a concentration in the filtered blood plasma was determined.

Figure 3:
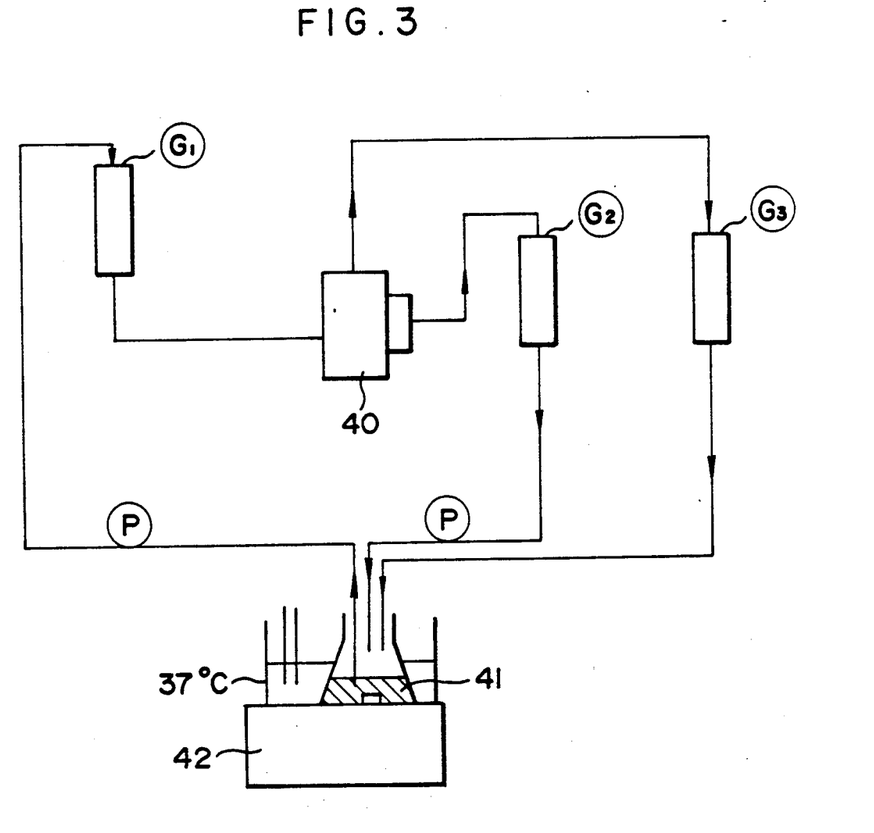
FIG. 3 is a circuit view according to the blood plasma separation experiment using the porous membrane of the present invention.

A disk-shaped module of membrane 130 cm² in surface area was tested with a circuit illustrated in FIG. 3 under the conditions of 25 mmHg of filtration pressure and 37° C. of temperature.

The porous hydrophilic membranes of Embodiment 35 and Comparative Examples 32 and 33 were each incorporated in a blood separation module 40 and stowed in a flask 41 provided with a stirrer 42 and used for the separation of blood plasma from bovine blood. In the diagram of FIG. 3, P stands for a pump and G1 to G3 stand each for a pressure gauge.

Said blood separation module is constructed similarly as described in International Publication No. WO 88/09200.

In this module using the porous membrane of Embodiment 35, a polymer having a glass transition temperature of not more than 300 K is grafted after protrusions for forming stable and appropriate fluid paths between the membranes are formed on the membrane surface.

The data obtained in the initial stage of filtration (10 minutes following the start of separation), in which the structures of the surfaces of membrane and the surfaces of pores in the membrane had conspicuous influences upon the adsorption of blood plasma proteins and the activation are shown in Table 9. The porous hydrophilic polypropylene membrane of the present invention recovered the fibrinogens F. VIII:C in high ratios and caused activation of the complemental system only sparingly, indicating excellence in the blood suitability.

The results are shown in Table 9.

TABLE 9

|  | Embodiment 35 1 | Comparative 32 | Example 33 |
|---|---|---|---|
| Wall thickness (μm) | 140 | 140 | 150 |
| $C_{3a}$ in filtered blood plasma/$C_{3a}$ in blood plasma before filtration | 2.0 | 5.6 | 21.2 |
| Ratio of recovery of fibrinogen (%) | 94 | 54 | 91 |
| Ratio of recovery of fibrinogens F.VIII:C (%) | 98 | 73 | 92 |
| Ratio of recovery of total proteins (%) | 97 | 91 | 89.0 |

What is claimed is:

1. A porous hydrophilic membrane comprising a porous membrane substrate having at least part of the surface of its pores formed with a polymer radical as a starting point for polymerization and then grafted with a polymer having a glass transition temperature of not more than 300 K, wherein said porous membrane has pores having a pores size of 0.02 to 10.0 μm, a void volume of 30 to 95% and an elongation at break of 10% or more when drawn monoaxially.

2. The porous membrane as claimed in claim 6, wherein the amount of the polymer is 5 parts by weight or more relative to 100 parts by weight of the porous membrane substrate.

3. The porous membrane as claimed in claim 1, wherein the polymer having a glass transition temperature of not more than 300 K is hydrophobic.

4. The porous membrane as claimed in claim 1, wherein the porous membrane substrate is made of a resin composed mainly of a polyolefin having a glass transition temperature of not more than 300 K, and has a membrane structure of a network structure formed by interconnecting fine particles having a particle diameter of 0.2 to 5.0 μm.

5. A porous membrane according to claim 1, wherein said porous membrane substrate is made of a resin composed mainly of a polyolefin having a glass transition temperature of not more than 300 K, and having a membrane structure of a network structure formed by interconnecting fine particles having a particle diameter of 0.2 to 0.5 μm, and wherein said graft chain is formed on the porous membrane substrate in ana mount of 5 parts by weight or more relative to 100 parts by weight of the porous membrane substrate, and made of a polymer having a glass transition temperature of not more than 300 K, wherein the vector element in the direction of the major axis of a segment obtained by connecting the center points of two of the fine particles which are adjacent in the direction of the major axis is longer than the vector element in the direction of the minor axis of the segment by 5 μm or more.

6. A porous membrane according to claim 1, wherein said porous membrane substrate has at least a part of the surface of tis pores grafted with a hydrophilic polymer having a glass transition temperature of not more than 300 K, wherein the hydrophilic polymer is formed by graft polymerization of a polymerizing monomer on the surface of the pores of the porous membrane substrate and bonded to the porous membrane substrate by covalent bond, and which has an elongation at break of 5% or more and a pore size of $10^{-2}$ μm to $10^2$ μm.

7. The porous membrane as claimed in claim 6, wherein the hydrophilic polymer formed on at least a part of the surface of the pore is comprised mainly of a polymerizable monomer as a recurring unit represented by the formula:

wherein $R_1$ represents $CH_2$, $C_2H_4$, $C_3H_6$ or $C_4H_8$ and $R_2$ represents $CH_3$, $C_2H_5$, $C_2H_4OC_2H_5$, $C_2H_4OCH_3$, $CH_2OC_2H_5$ or $CH_2OCH_3$.

8. The porous membrane as claimed in claim 6, wherein the hydrophilic polymer formed on at least a part of the surface of the pore is methoxyethyl acrylate.

9. The rubber-like porous composite material as claimed in claim 1, wherein the synthetic polymer constituting the porous membrane substrate is comprised mainly of a polyolefin or a halogenated polyolefin and has, at least a part of the surface thereof, a network structure whose linear portion has a thickness of 5 μm or less.

10. A filter comprising:
a housing having an inlet for a liquid to be filtered and an outlet for a filtrate,
a porous membrane disposed in the housing so as to divide the space in the housing into a compartment for the liquid and a compartment for the filtrate,
the porous membrane as claimed in claim 6, further comprising:
a membrane structure of a network structure formed by interconnecting fine particles having a particle diameter of 0.2 to 5.0 μm, and
a graft chain formed on the porous membrane substrate in an amount of 5 parts by weight or more relative to 100 parts by weight of the porous membrane substrate, and made of a polymer having a glass transition temperature of not higher than 300 K,
wherein the vector element int eh direction of the major axis of a segment obtained by connecting the center points of two of the fine particles which are adjacent in the direction of the major axis is longer than the vector element in the direction of the minor axis of the segment by 5 μm or more.

11. A liquid treating module comprising:
a porous membrane,
first and second compartments which are separated by the porous membrane,
at least one member selected form the group consisting of an enzyme, a cell of an animal, a cell of a plant, a yeast and a microorganism, and
an inlet for a liquid to be treated and an outlet for a treated liquid,
the porous membrane as claimed in claim 1, further comprising:
a membrane structure of a network structure formed by interconnecting fine particles having a particle diameter of 0.2 to 5.0 μm, and
a graft chain formed on the porous membrane substrate in an amount of 5 parts by weight or more relative to 100 parts by weight of the porous membrane substrate, and made of a polymer having a glass transition temperature of not more than 300 K,
wherein the vector element in the direction of the major axis of a segment obtained by connecting the center points of two of the fine particles which are adjacent in the direction of the major axis is longer than the vector element in the direction of the minor axis of the segment by 5 μm or more.

12. A porous membrane according to claim 1, wherein said porous membrane substrate has at least part of the surface of its pores formed with a polymer radical as a starting point for polymerization by treatment with a low temperature plasma and grafted with a polymer having a glass transition temperature of not more than 300 K by introducing a gaseous polymerizable monomer under a reduced pressure and non-plasma condition.

13. A porous hydrophilic membrane comprising a porous membrane substrate having at least part of the surface of its pores formed with a polymer radical as a starting point for polymerization by treatment with a low temperature plasma and then grafted with a polymer having a glass transition temperature of not more than 300 K by introducing a gaseous polymerizable monomer under a reduced pressure and non-plasma condition, wherein said porous membrane has pores having a pore size of 0.02 to 10.0 μm, a void volume of 30 to 95% and an elongation at break of 10% or more when drawn monoaxially.

14. The porous membrane as claimed in claim 13, wherein the amount of the polymer is 5 parts by weight or more relative to 100 parts by weight of the porous membrane substrate.

15. The porous membrane as claimed in claim 13, wherein the polymer having a glass transition temperature of not more than 300 K comprises a hydrophobic polymer.

16. The porous membrane as claimed in claim 13, wherein the porous membrane substrate is made of a resin composed mainly of a polyolefin having a glass transition temperature of not more than 300 K, and has a membrane structure of a network structure formed by interconnecting fine particles having a particle diameter of 0.2 to 5.0 μm.

17. A porous membrane according to claim 1, wherein said porous membrane substrate has at least part of the surface of its pores grafted with a hydrophilic polymer having a glass transition temperature of not more than 300 K, wherein the hydrophilic polymer is formed by graft polymerization of a polymerizing monomer on the surface of the pores of the porous membrane substrate and bonded to the porous membrane substrate by covalent bond, and which ash an elongation at break of 5% or more and a pore size of $10^{-2}$ μm to $10^{-2}$ μm.

18. The rubber-like porous composite material comprising:
a porous membrane substrate comprising a continuous phase composed of a synthetic polymer comprising mainly a polypropylene or a polyvinylidene fluoride, and
a polymer having rubber elasticity comprising monomer units having an unsaturated bond in their molecule and grafted on at least a part of the surface of the continuous phase in an amount of 20% by weight or more relative to the weight of the porous membrane substrate and which undergoes an elongation set of 10% or less when drawn at an elongation of 50%, wherein said polymer grafted on at least a part of the surface of the continuous phase is subjected to at least one drawing-relaxation treatment and wherein aid pores of the porous composite material have a pore size of 0.02 to 20 μm and a void volume of 20 to 80%.

19. The rubber-like porous composite material as claimed in claim 18, which has a thickness of 10 μm to 2.0 mm.

20. The rubber-like porous composite material as claimed in claim 18, wherein the synthetic polymer constituting the porous membrane substrate has at least on a part of the surface thereof, a network structure whose linear portion has a thickness of 5 μm or less.

21. The porous composite material as claimed in claim 18, wherein the porous membrane substrate is made of a resin composed mainly of a polyolefin having a glass transition temperature of not more than 300 K, and has a membrane structure of a network structure formed by interconnecting fine particles having a particle diameter of 0.2 to 5.0 μm.

22. A porous composite material as claimed in claim 18, wherein the porous membrane substrate is made of a resin composed mainly of a polyolefin having a glass transition temperature of not more than 300 K, and having a membrane structure of a network structure formed by interconnecting fine particles having a particle diameter of 0.2 to 5.0 μm, and
  wherein said graft chain is formed on the porous membrane substrate in an amount of 5 parts by weight or more relative to 100 parts by weight of the porous membrane substrate, and made of a polymer having a glass transition temperature of not more than 300 K, wherein the vector element in the direction of the major axis of a segment obtained by connecting the center points of two of the fine particles which are adjacent in the direction of the major axis is longer than the vector element in the direction of the minor axis of the segment by 5 μm or more.

23. A filter comprising:
  a housing having an inlet for a liquid to be filtered and an outlet for a filtrate,
  a porous membrane disposed in the housing so as to divide the space in the housing into a compartment for the liquid and a compartment for the filtrate,
  the porous membrane comprising a porous composite material as claimed in claim 18 having:
  a membrane structure of a network structure formed by interconnecting fine particles having a particle diameter of 0.2 to 5.0 μm, and
  a graft chain formed on the porous membrane substrate in an amount of 5 parts by weight or more relative to 100 parts by weight of the porous membrane substrate, and made of a polymer having a glass transition temperature of not higher than 300 K,
  wherein the vector element in the direction of the major axis of a segment obtained by connecting the center points of two of the fine particles which are adjacent in the direction of the major axis is longer than the vector element in the direction of the minor axis of the segment by 5 μm or more.

24. A liquid treating module comprising:
  a porous membrane,
  first and second compartments which are separated by the porous membrane,
  at least one member selected from the group consisting of an enzyme, a cell of an animal, a cell of a plant, a yeast and a microorganism, and
  an inlet for a liquid to be treated and an outlet for a treated liquid,
  the porous membrane comprising the porous composite material as claimed in claim 18 having a membrane structure of a network structure formed by interconnecting fine particles having a particle diameter of 0.2 to 5.0 μm, and
  a graft chain formed on the porous membrane substrate in an amount of 5 parts by weight or more relative to 100 parts by weight of the porous membrane substrate, and made of a polymer having a glass transition temperature of not more than 300 K,
  wherein the vector element i the direction of the major axis of a segment obtained by connecting the center points of two of the fine particles which are adjacent in the direction of the major axis is longer than the vector element in the direction of the minor axis of the segment by 5 μm or more.

25. A porous membrane comprising a porous membrane substrate having at least a part of the surface of its pores grafted with a polymer having a glass transition temperature of not more than 300 K, wherein said porous membrane has pores having a pore size of 0.02 to 10.0 μm, a void volume of 30 to 95% and an elongation at break of 10% or more when drawn monoaxially, wherein said porous membrane is prepared by subjecting the porous membrane substrate to plasma treatment at a low temperature, and introducing a gaseous polymerizable monomer under a pressure of 0.1 to 100.0 Torr to form graft chains made of a polymer having a glass temperature of not more than 300 K, followed by monoaxial drawing at a temperature of the polymer at a draw ratio of 10 to 1000%.

26. The porous membrane as claimed in claim 25, wherein the porous membrane substrate is made of a resin composed mainly of a polyolefin having a glass transition temperature of not more than 300 K, and has a membrane structure of a network structure formed by interconnecting fine particles having a particle diameter of 0.2 to 5.0 μm.

27. The porous membrane as claimed in claim 25, wherein said porous membrane substrate is made of a resin composed mainly of a polyolefin having a glass transition temperature of not more than 300 K, and having a membrane structure of a network structure formed by interconnecting fine particles having a particle diameter of 0.2 to 5.0 μm, and
  wherein said graft chain is formed on the porous membrane substrate in an amount of 5 parts by weight or more relative to 100 parts by weight of the porous membrane substrate, and made of a polymer having a glass transition temperature of not more than 300 K, wherein the vector element in the direction of the major axis of a segment obtained by connecting the center points of two of the fine particles which are adjacent in the direction of the major axis is longer than the vector element in the direction of the minor axis of the segment by 5 μm or more.

28. The rubber-like porous composite material as claimed in claim 25, wherein the synthetic polymer constituting the porous membrane substrate is comprised mainly of a polyolefin or a halogenated polyolefin and has, at least a part of the surface thereof, a network structure whose linear portion has a thickness of 5 μm or less.

29. A filter comprising:
a housing having an inlet for a liquid to be filtered and an outlet for a filtrate,
a porous membrane disposed in the housing so as to divide the space in the housing into a compartment for the liquid and a compartment for the filtrate,
the porous membrane as claimed in claim 25, further comprising:
a membrane structure of a network structure formed by interconnecting fine particles having a particle diameter of 0.2 to 5.0 μm, and
a graft chain formed on the porous membrane substrate in an amount of 5 parts by weight or more relative to 100 parts by weight of the porous membrane substrate, and made of a polymer having a glass transition temperature of not higher than 300 K,
wherein the vector element int eh direction of the major axis of a segment obtained by connecting the center points of two of the fine particles which are adjacent in the direction of the major axis is longer than the vector element in the direction of the minor axis of the segment by 5 μm or more.

30. A liquid treating module comprising:
a porous membrane,
first and second compartments which are separated by the porous membrane,
at least one member selected from the group consisting of an enzyme, a cell of an animal, a cell of a plant, a yeast and a microorganism, and
an inlet for a liquid to be treated and an outlet for a treated liquid,
the porous membrane as claimed in claim 25, further comprising:
a membrane structure of a network structure formed by interconnecting fine particles having a particle diameter of 0.2 to 5.0 μm, and
a graft chain formed on the porous membrane substrate in an amount of 5 parts by weight or more relative to 100 parts by weight of the porous membrane substrate, and made of a polymer having a glass transition temperature of not more than 300 K,
wherein the vector element in the direction of the major axis of a segment obtained by connecting the center points of two of the fine particles which are adjacent in the direction of the major axis is longer than the vector element in the direction of the minor axis of the segment by 5 μm or more.

31. A method for preparing a porous membrane which comprises:
subjecting a porous membrane substrate to plasma treatment at a low temperature, and
introducing a gaseous polymerizable monomer under a pressure of 0.1 to 100.0 Torr to form graft chains made of a polymer having a glass transition temperature of not more than 300 K, followed by monoaxial drawing at a temperature more than the glass transition temperature of the polymer at a draw ratio of 10 to 1000%.

32. The method as claimed in claim 31, wherein the graft chains are formed by graft-polymerizing a hydrophobic polymerizable monomer.

* * * * *